(12) United States Patent
Johansson

(10) Patent No.: US 9,031,185 B2
(45) Date of Patent: May 12, 2015

(54) FUEL ASSEMBLY, A GUIDE THIMBLE DEVICE AND USE OF THE GUIDE THIMBLE DEVICE

(75) Inventor: Lennart I. Johansson, Vasteras (SE)

(73) Assignee: Westinghouse Electric Sweden AB, Vasteras (SE)

( * ) Notice: Subject to any disclaimer, the term of this patent is extended or adjusted under 35 U.S.C. 154(b) by 276 days.

(21) Appl. No.: 13/698,009

(22) PCT Filed: May 10, 2011

(86) PCT No.: PCT/SE2011/050586
§ 371 (c)(1),
(2), (4) Date: Nov. 14, 2012

(87) PCT Pub. No.: WO2011/149408
PCT Pub. Date: Dec. 1, 2011

(65) Prior Publication Data
US 2013/0058449 A1 Mar. 7, 2013

(30) Foreign Application Priority Data
May 25, 2010 (SE) ..................................... 1050519

(51) Int. Cl.
*G21C 3/33* (2006.01)
*G21C 7/10* (2006.01)
(52) U.S. Cl.
CPC ................. *G21C 3/33* (2013.01); *G21C 3/3315* (2013.01); *G21C 7/10* (2013.01); *Y02E 30/39* (2013.01)
(58) Field of Classification Search
CPC .......... G21C 3/33; G21C 3/3315; G21C 7/10; Y02E 30/39

USPC .................................. 376/353, 434, 446, 449
See application file for complete search history.

(56) References Cited

U.S. PATENT DOCUMENTS 4,284,475 A * 8/1981 Anthony ....................... 376/446
4,617,171 A  10/1986 Feutrel
(Continued)

FOREIGN PATENT DOCUMENTS

| | | | |
|---|---|---|---|
| EP | 0222623 A1 | 5/1987 |
| EP | 0817204 A1 | 1/1998 |
| JP | S61-226686 A | 10/1986 |
| JP | S62-116290 A | 5/1987 |

(Continued)

OTHER PUBLICATIONS

International Searching Authority, International Search Report for International Application No. PCT/SE2011/050586, mailed Aug. 11, 2011, 3 pages, European Patent Office, The Netherlands.

(Continued)

*Primary Examiner* — Jack W Keith
*Assistant Examiner* — Daniel Wasil
(74) *Attorney, Agent, or Firm* — Alston & Bird LLP

(57) ABSTRACT

The invention refers to a fuel assembly comprising a lower end structure, an upper end structure including a top nozzle (5), a plurality of fuel rods and a plurality of guide thimbles (3). The top nozzle includes a passageway and an annular groove (10) in said passageway. A sleeve (11) is provided for attaching the guide thimble (3) to the top nozzle (5). The sleeve has at least three slots (12) and includes at least three bulges (13). Each bulge (13) has two ends and extends between two of the slots (12). At least one of the ends of the bulge (13) extends to a position at a distance (d) from the respective slot (12). The invention also refers to a guide thimble device (9) for use in a fuel assembly.

10 Claims, 4 Drawing Sheets

(56) References Cited

U.S. PATENT DOCUMENTS

| | | | |
|---|---|---|---|
| 4,631,168 A | | 12/1986 | Shallenberger et al. |
| 4,641,409 A | | 2/1987 | Shallenberger et al. |
| 4,684,498 A | | 8/1987 | Paul |
| 4,688,416 A | * | 8/1987 | Shallenberger et al. ...... 376/261 |
| 4,699,760 A | | 10/1987 | Shallenberger et al. |
| 4,999,154 A | * | 3/1991 | Petit ............................ 376/449 |
| 5,120,492 A | | 6/1992 | Guironnet et al. |
| 5,180,550 A | * | 1/1993 | Nylund ........................ 376/449 |
| 5,361,283 A | * | 11/1994 | Attix ............................ 376/446 |
| 5,367,548 A | * | 11/1994 | Attix ............................ 376/446 |
| 5,852,644 A | | 12/1998 | Brosset et al. |
| 6,002,736 A | * | 12/1999 | Leroux et al. ................. 376/446 |
| 2009/0122947 A1 | | 5/2009 | Park et al. |

FOREIGN PATENT DOCUMENTS

| | | |
|---|---|---|
| JP | H02-115791 A | 4/1990 |
| KR | 2009/0021504 A | 3/2009 |

OTHER PUBLICATIONS

The International Bureau of WIPO, International Preliminary Report on Patentability for International Application No. PCT/SE2011/050586, mailed Dec. 6, 2012, 8 pages, Switzerland.

Japan Patent Office, Notice of Reasons for Rejection for Application No. 2013-512573, Dec. 16, 2014, 3 pages, Japan.

Nuclear and Industrial Safety Agency, Takahama Power Plant No. 1 and No. 2 Reactors Use of High Burnup Fuel, Dec. 2009, 37 pages, Japan.

* cited by examiner

FUEL ASSEMBLY, A GUIDE THIMBLE DEVICE AND USE OF THE GUIDE THIMBLE DEVICE

CROSS REFERENCE TO RELATED APPLICATIONS

This application is a national stage application, filed under 35 U.S.C. §371, of International Application No. PCT/SE2011/050586, filed May 10, 2011, which claims priority to Swedish Patent Application No. 1050519-6, filed May 25, 2010, both of which are hereby incorporated by reference in their entirety.

BACKGROUND OF THE INVENTION

Related Field

The present invention relates to fuel assemblies for pressurized water reactors according to the presently pending claims. The present invention also relates to a guide thimble device according to the presently pending claims and to use of the guide thimble device in a fuel assembly.

U.S. Pat. No. 4,631,168 discloses a fuel assembly for nuclear pressurized water reactors comprising a number of elongated fuel elements or rods and guide thimbles held together by spacers spaced along the assembly length and attached to the guide thimbles. The top and bottom nozzles extend slightly above and below the ends of the fuel rods on opposite ends and are secured to the guide thimbles.

The top nozzle is removable and includes a passageway extending through the top nozzle and an annular groove formed in said passageway.

A guide thimble device includes a guide thimble and an elongated sleeve configured for attaching the guide thimble to the top nozzle. The sleeve has slots in the upper end portion of said sleeve. Each slot extends downwardly from a top end of said sleeve, wherein the upper end portion of the sleeve includes shoulders or bulges. The bulges seat in the annular grooves comprised in the passageway in the top nozzle, when the sleeve is in an expanded locked position within said passageway. Each bulge has two ends and extends between two of the slots. Each bulge has a circumferential bulge profile.

The top nozzle is connected to the fuel assembly in a removable manner. This is necessary for several reasons, for example, to have access to the fuel rods when these need to be replaced. The fuel assemblies are transported in and out of the reactor by lifting the fuel assembly by the top nozzle. This means that the attachment structure that connects the top nozzle with the guide thimbles needs to be strong enough to hold the weight of the fuel assembly.

Apart from the mechanical attachment function, the guide thimbles also serve to house absorbent or control rods used for controlling the chain reaction at any time. These control rods are inserted into the guide thimble through the top nozzle, which has passages for this purpose. The control rods are inserted into the guide thimble with force and as rapidly as possible. Again, it is important that the attachment structure is strong enough to withstand these forces.

U.S. Pat. No. 4,617,171 describes a fuel assembly wherein the bulge on the sleeve of the guide thimble has different profiles. The bulge described may for example have a rectangular profile (FIG. 3), with attachment threads (FIG. 4) or a biconical profile (FIG. 5).

All bulges described in the prior art extend from slot to slot in a circumferential manner.

BRIEF SUMMARY

Object of the present invention is to improve the attachment of the guide thimble device in a top nozzle of a fuel assembly.

This object is achieved by the guide thimble device initially defined and which is characterized in that at least one end of the bulge extends to a position at a distance from the respective slot.

One effect of this novel profile of the bulge is that the guide thimble device can withstand a higher axial load before the bulge begins to straighten. This increases the strength of the attachment of the guide thimble to the top nozzle.

An advantage with the improved design is that by letting the cylindrical part of the sleeve pass by on at least one side of the bulge, the material in this area must exceed the yield point in tension, before the bulges can start to straighten. Thereby, the bulge can withstand a higher load. In the existing design of the bulges, the bulges may start to straighten before the yield point has been reached. As explained above, this results in improved security at the nuclear reactor plant.

The improved bulges can be used in existing attachment structures without having to redesign the other parts in the joint.

In the prior art different profiles of the bulge have been described to improve said attachment. All bulges described extend from slot to slot in a circumferential manner. No hints are given that the strength of the attachment can be improved with a bulge consisting of two ends and whereby at least one end of the bulge extends to a position at a distance from the respective slot.

The present invention further relates to the guide thimble device initially defined and which is characterized in that at least one end of the bulge extends to a position at a distance from the respective slot.

The present invention also relates to use of the guide thimble device in a fuel assembly.

In one embodiment of the invention the bulge has an end portion at the respective end, wherein the end portion has a curved shape in a longitudinal section and in a transversal section along the bulge. Such a curvature will further improve the strength of the sleeve, and increase the resistance to deformation of the bulge and the sleeve. Thus the attachment of the sleeve in the passageway of the top nozzle is further enhanced.

In one embodiment of the invention, both ends of the bulge extend to a position at a distance from the respective slot. In another embodiment, one end of the bulge extends to a position at a distance from the respective slot.

In another embodiment of the invention, the bulges are provided so that there is one bulge between each pair of adjacent slots.

In one embodiment of the invention, the bulges are provided circumferentially after each other.

In one embodiment of the invention, the sleeve has a wall thickness seen in a radial direction with respect to the longitudinal direction.

The distance between the end of the bulge and the slot may be important for the axial strength of the material. In one embodiment of the invention, the distance is equally long, or at least equally long, as the wall thickness of the sleeve. In another embodiment, the distance is two or three times longer than the wall thickness of the sleeve, or even longer.

The wall thickness of the sleeve may also be important for the axial strength of the material. In one embodiment of the invention, the wall thickness is in the range of from 0.20 to 0.50 mm.

The sleeve may be divided into several slots. In one embodiment of the invention, the sleeve has 3, 4, 5 or 6 slots.

The profile of the bulges may vary. In one embodiment of the invention, the bulge has a cylindrical profile seen in a longitudinal section.

BRIEF DESCRIPTION OF THE FIGURES

The present invention will now be explained more closely by means of a description of various embodiments and with reference to the drawings attached hereto.

DETAILED DESCRIPTION OF VARIOUS EMBODIMENTS

Figure 1:
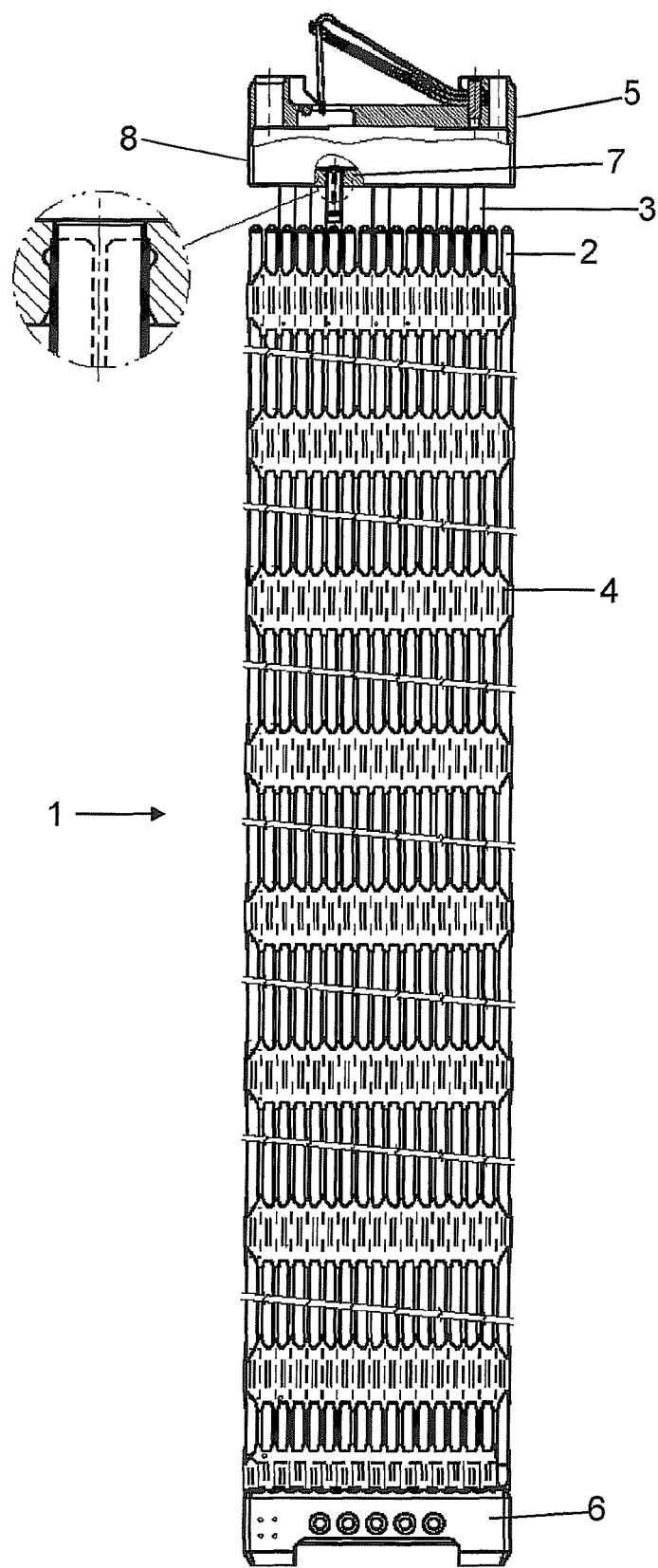
FIG. 1 shows a side view of a fuel assembly for a nuclear pressurized water reactor.

FIG. 1 shows a fuel assembly 1 for a nuclear pressurized water reactor. The fuel assembly 1 comprises a number of elongated fuel rods 2 and guide thimbles, or guide tubes, 3 held together by spacers 4 spaced along the fuel assembly 1 length and attached to the guide thimbles 3. Top and bottom nozzles 5 and 6 extend slightly above and below the ends of the fuel rods 2 on opposite ends and are secured to the guide thimbles 3. The top nozzle 5 includes a transversely extending adapter plate 7 having upstanding sidewalls 8. Within the opening defined by the sidewalls 8 is a conventional rod cluster control assembly (not shown) introducible for vertically moving the control rods in the guide thimbles 3.

Figure 3:
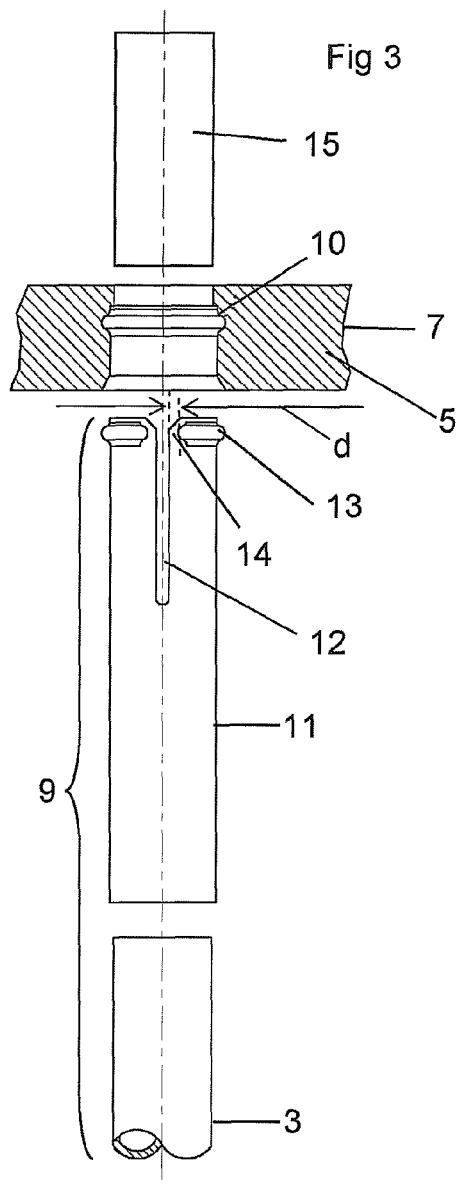
FIG. 3 shows an exploded view of the parts shown in FIG. 2.
Figure 2:
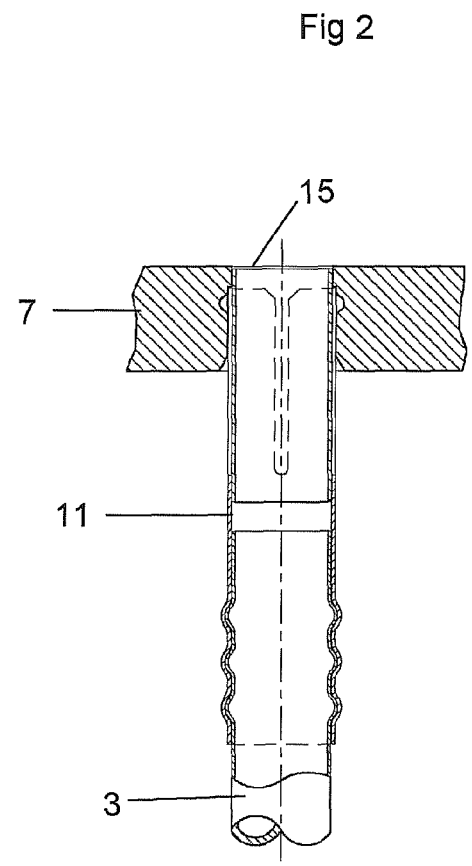
FIG. 2 shows a partly sectional view of an attachment of a guide thimble device to a top nozzle of the fuel assembly in FIG. 1.
Figure 4:
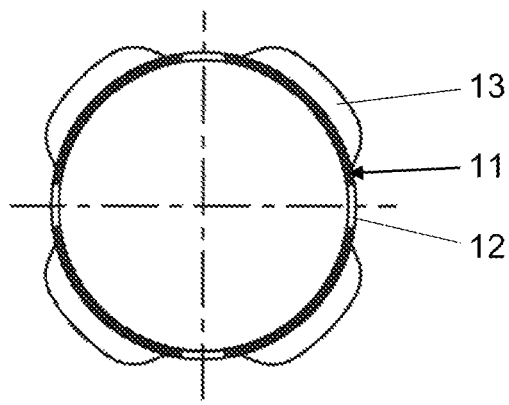
FIG. 4A shows an end view of an elongated sleeve having four slots according to various embodiments.
FIG. 4B shows a cross-section of the elongated sleeve of FIG. 4A.
Figure 5:
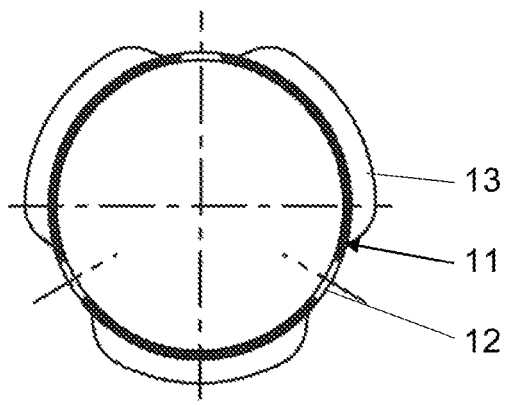
FIG. 5A shows an end view of an elongated sleeve having three slots according to various embodiments.
FIG. 5B shows a cross-section of the elongated sleeve of FIG. 5A.
Figure 4:
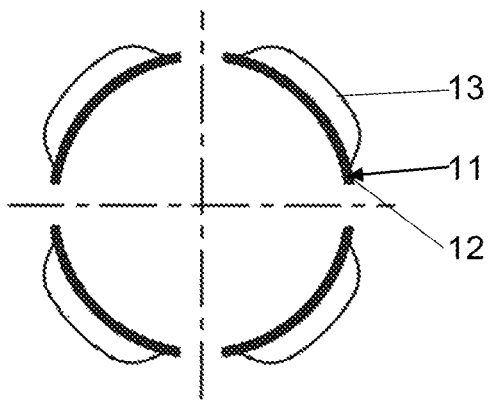
Figure 5:
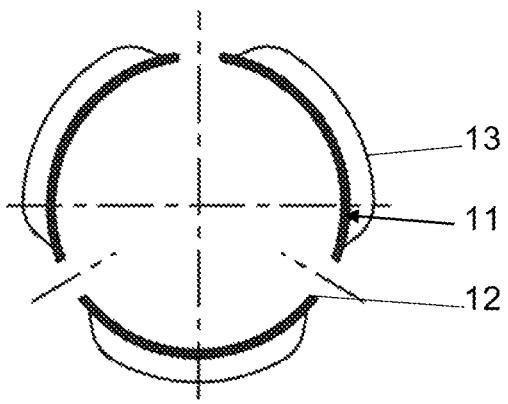
Figure 6:
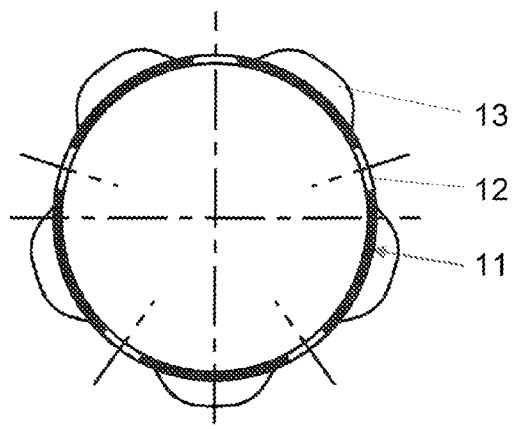
FIG. 6A shows an end view of an elongated sleeve having five slots according to various embodiments.
FIG. 6B shows a cross-section of the elongated sleeve of FIG. 6A.
Figure 7:
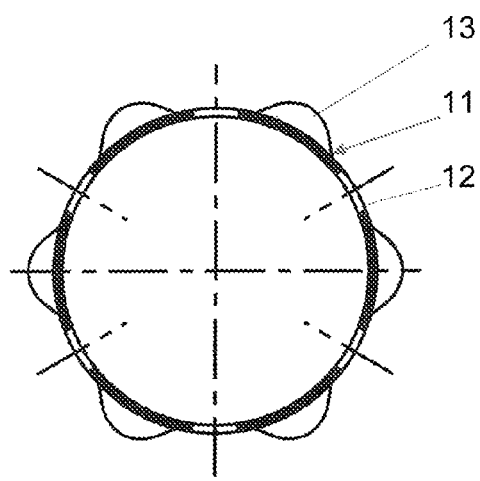
FIG. 7A shows an end view of an elongated sleeve having six slots according to various embodiments.
FIG. 7B shows a cross-section of the elongated sleeve of FIG. 7A.
Figure 6:
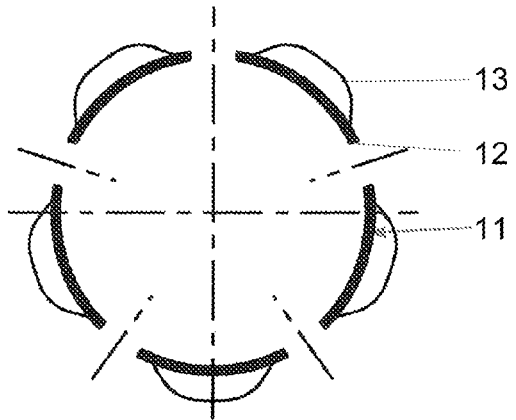
Figure 7:
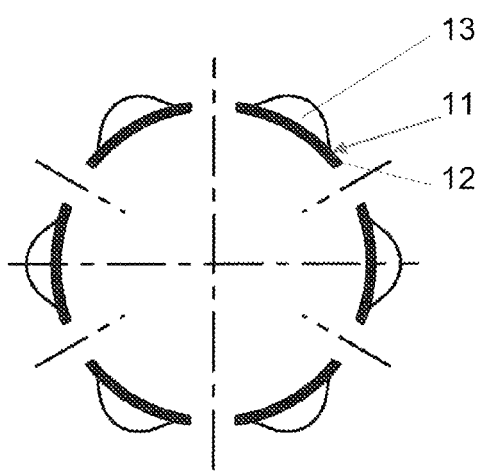

FIGS. 2 and 3 show a part of a guide thimble device 9 present in the top nozzle 5. The top nozzle 5 includes a plurality of passageways extending through the adapter plate 7 of the top nozzle 5. An annular groove 10 is formed in each passageway. The guide thimble device 9 comprises a guide thimble 3 and an elongated sleeve 11 provided at an upper end of the guide thimble 3. The elongated sleeve 11 is cylindrical and has slots 12 in the upper end portion of the sleeve 11. The slots 12 extend downwardly from a top end of the sleeve 11. Bulges 13 are provided between the slots 12 positioned at distance d from the slot 12. The bulges 13 project outwardly from the cylindrical sleeve 11. Thanks to the distance d, there is a cylindrically shaped area 14 located between the end of the bulge 13 and the slot 12. A locking member 15 is introduced into the sleeve 11 from above the top nozzle 5.

The sleeve 11 included in the guide thimble 3 may be an integrated part of the guide thimble 3. The sleeve 11 may also be a separated part of the guide thimble 3 attached thereto by any means, for instance by plastic deformation as indicated in FIG. 2.

In the embodiment disclosed, both ends of the bulge 13 extend, as mentioned above, to a position at a distance d from the respective slot 12. It may also be possible to let only one end of the bulge 13 extend to a position at a distance d from the respective slot 12.

As can be partly seen in FIG. 3, each the bulge 13 has an end portion at the respective end of the bulge 13. The end portions defining or including the respective end has a curved shape seen in a radial direction. Moreover, each of the end portions has a curved shape in a longitudinal section and in a transversal section along the bulge.

The bulges 13 are provided so that there is one bulge 13 between each pair of adjacent slots 12. The bulges 13 may alternatively be provided so that there are two bulges 13 between each pair of adjacent slots 12 or even so that there are three bulges 13 between each pair of adjacent slots 12. This may be understood with further reference to FIGS. 4A-7B.

Furthermore, the bulges 13 are provided circumferentially after each other. Alternatively, the neighbouring bulges 13 are not provided circumferentially but at different distances from the top end of the sleeve 11. This may be understood with further reference to FIGS. 4A-7B.

The sleeve 11 has a wall thickness seen in a radial direction with respect to the longitudinal direction. The wall thickness is in the range of from 0.20 to 0.50 mm. The wall thickness may be in the range of from 0.25 to 0.40 mm, or in the range of from 0.30 to 0.35 mm. Alternatively, the wall thickness ranges from 0.20 to 0.35 mm, from 0.20 to 0.40 mm, or from 0.30 to 0.40 mm.

The distance d mentioned above is equally long or is at least equally long as the wall thickness of the sleeve 11. The distance d may also be two times longer than the wall thickness of the sleeve 11. Alternatively, the distance d is three times longer than the wall thickness of the sleeve 11. Otherwise, the distance d ranges between one to five times the wall thickness of the sleeve 11.

As mentioned above, the sleeve 11 may comprise or be divided into several slots 12. In the embodiment disclosed the sleeve 11 has four slots 12. Alternatively, the sleeve 11 may have three slots 12 or the sleeve 11 may have five slots 12 or more. These three, four, or five slot configurations may be understood with further reference to FIGS. 4A-7B, respectively.

The bulge 13, at least between the end portions, may have a cylindrical profile seen in a longitudinal section. Alternatively, the bulge 13 may have any suitable outwardly projecting profile such as a rectangular or a biconical profile.

The present invention is not limited to the embodiments disclosed but may be varied and modified within the scope of the following claims.

The invention claimed is:

1. A fuel assembly (1) for a nuclear pressurized water reactor, said fuel assembly comprising:
    a lower end structure (6);
    an upper end structure including a top nozzle (5);
    a plurality of elongated fuel rods (2);
    a plurality of longitudinally extended guide thimbles (3) extending in a longitudinal direction from the lower end structure (6) to the top nozzle (5), said top nozzle (5)

including a passageway extending through the top nozzle (5) and an annular groove (10) formed in said passageway;

an elongated sleeve (11) formed by each of the plurality of longitudinally extended guide thimbles (3), the sleeves (11) each being configured for attaching a portion of the guide thimble (3) to the top nozzle (5) and each having at least three slots (12) in an upper end portion of said sleeve (11), each slot (12) extending downwardly from a top end of said sleeve (11) and a plurality of locking members (15), each locking member (15) being introduced into and positioned within a respective one of the elongated sleeves (11) from above the top nozzle (5), wherein:
the upper end portion of the sleeve (11) includes at least three bulges (13), each of which said at least three bulges (13) seat in said annular groove (10) when said sleeve (11) is in an expanded locked position within said passageway;

each of said at least three bulges (13) has two ends and extends circumferentially between a nearest two of the slots (12);

wherein the two ends of each of said at least three bulges (13) are circumferentially spaced from each other; and at least one of the two ends of each of said at least three bulges (13) is located at a position which is at a spaced circumferential distance (d) from a nearest one of the two slots (12).

2. The fuel assembly according to claim 1, wherein each of said bulges (13) has an end portion at a respective end, wherein the end portion has a curved shape in a longitudinal section and in a transversal section along the bulges (13).

3. The fuel assembly according to claim 1, wherein both ends of each of said bulges (13) extend to a position at a distance (d) from the respective slot (12).

4. The fuel assembly according to claim 1, wherein said bulges (13) are provided so that there is at least one bulge (13) between each pair of adjacent slots (12).

5. The fuel assembly according to claim 1, wherein said bulges (13) are provided circumferentially after each other.

6. The fuel assembly according to claim 1, wherein:
the sleeve (11) has a wall thickness seen in a radial direction with respect to the longitudinal direction; and
the distance (d) between the end of each of said at least three bulges (13) and the nearest slot (12) is at least equally long as the wall thickness of the sleeve (11).

7. The fuel assembly according to claim 1, wherein:
the sleeve (11) has a wall thickness seen in a radial direction with respect to the longitudinal direction; and
the distance (d) between the end of each of said at least three bulges (13) and the nearest slot (12) is two or three times longer than the wall thickness of the sleeve (11).

8. The fuel assembly according to claim 1, wherein:
the sleeve (11) has a wall thickness seen in a radial direction with respect to the longitudinal direction; and
the wall thickness of the sleeve (11) is in the range of from 0.20 to 0.50 mm.

9. The fuel assembly according to claim 1, wherein the sleeve (11) has at least one of 3, 4, 5 or 6 slots (12).

10. The fuel assembly according to claim 1, wherein at least one of the bulges (13) has a cylindrical profile seen in a longitudinal section.

* * * * *